United States Patent
Sato et al.

(10) Patent No.: US 6,436,261 B1
(45) Date of Patent: Aug. 20, 2002

(54) ELECTRIC DEIONIZING APPARATUS AND PROCESS FOR DEIONIZATION USING THE SAME

(75) Inventors: Shin Sato, Sagamihara; Takayuki Moribe, Kawagoe, both of (JP)

(73) Assignee: Kurita Water Industries, Ltd., Tokyo (JP)

( * ) Notice: Subject to any disclaimer, the term of this patent is extended or adjusted under 35 U.S.C. 154(b) by 0 days.

(21) Appl. No.: 09/705,228

(22) Filed: Nov. 2, 2000

(30) Foreign Application Priority Data

Nov. 2, 1999 (JP) .......................................... 11-312854

(51) Int. Cl.[7] .............................................. B01D 61/48
(52) U.S. Cl. ....................... 204/524; 204/533; 204/632; 205/749
(58) Field of Search ................................ 204/627, 630, 204/632, 634, 524, 533; 205/749

(56) References Cited

U.S. PATENT DOCUMENTS

| | | | |
|---|---|---|---|
| 4,298,442 A | 11/1981 | Giuffrida | ................. 204/180 P |
| 4,632,745 A | 12/1986 | Giuffrida et al. | ........... 204/301 |
| 4,925,541 A | 5/1990 | Giuffrida et al. | ........ 204/182.5 |
| 4,956,071 A | 9/1990 | Giuffrida et al. | ........... 204/301 |

FOREIGN PATENT DOCUMENTS

| | | |
|---|---|---|
| JP | 4-72567 B | 11/1992 |
| JP | 7-16587 B | 3/1995 |

*Primary Examiner*—Arun S. Phasge
*Assistant Examiner*—Thomas H. Parsons
(74) *Attorney, Agent, or Firm*—Frishauf, Holtz, Goodman & Chick, P.C.

(57) ABSTRACT

An electric deionizing apparatus comprising a first and a second electric deionizing apparatus arranged in series, in which water is deionized by the first electric deionizing apparatus and then deionized by the second electric deionizing apparatus, and a means for adding an aqueous electrolyte solution into water released from the first electric deionizing apparatus and which is supplied into the second electric deionizing apparatus. A process for electric deionization comprising supplying water to a first electric deionizing apparatus, deionizing the water in the first electric deionizing apparatus, adding an aqueous electrolyte solution to the deionized water, supplying the deionized water to a second electric deionizing apparatus and deionizing the supplied deionized water in the second electric deionizing apparatus. Silica and boron components in the water are effectively removed to obtain deionized water having a high resistivity.

28 Claims, 2 Drawing Sheets

ELECTRIC DEIONIZING APPARATUS AND PROCESS FOR DEIONIZATION USING THE SAME

BACKGROUND OF THE INVENTION

1. Field of the Invention

The present invention relates to an electric deionizing apparatus and a process for electric deionization using the apparatus. More particularly, the present invention relates to an electric deionizing apparatus which effectively removes silica and boron components, in particular, silica components, from material water (water to be deionized) and provides deionized water having a high resistivity and a process for deionization using the apparatus.

2. Description of the Related Art

Water has been used for industrial, household and agricultural uses. As water is more extensively used in these areas, the importance of water is increasing. Specific types of water such as pure water and ultrapure water are being required in chemical industries and novel industries of advanced technology. On the other hand, utilization of water of lower qualities such as sewage, regenerated industrial waste water and rain water has been advancing in order to save water resources. For example, water of lower qualities is used for miscellaneous applications in buildings such as water for flushing toilets, cooling and cleaning.

As the technology for deionizing industrial water, sewage and industrial waste water to produce water of a high quality, various processes ranging from a simple flocculation and precipitation process to high grade processes utilizing membranes have been developed and actually used. As the apparatus used in such processes, for example, apparatuses using fine filtering membranes (MF membranes), ultrafine filtering membranes (UF membranes), reverse osmotic membranes (RO membranes) and dialytic membranes and electric deionizing apparatuses are known.

The electric deionizing apparatus, among these apparatuses, have a desalting compartment having a structure such that a cation exchange membrane and an anion exchange membrane are disposed as two side faces of the compartment and the space between the side faces is packed with an ion exchanger such as an ion exchange resin and an ion exchange fiber. Water is passed through the desalting compartment (differential pressure: 0.2 to 2 kg/cm$^2$) while a voltage is applied to the compartment. Anions pass through the anion exchange membrane and are removed. Cations pass through the cation exchange membrane and are removed. The electric deionizing apparatus is characterized in that regeneration of chemicals is not necessary and that the apparatus is compact. Electric deionizing apparatuses having large capacities have been developed in recent years and are attracting attention.

As the semiconductor industry grows, demand for ultrapure water which is indispensable for the production of semiconductor devices is increasing. For the production of ultrapure water, the above electric deionizing apparatuses are increasingly used.

Ultrapure water can be produced by thoroughly removing all impurities which are not the pure water molecule and a complicated process is required for the production of ultrapure water. Processes having various combinations of steps are actually used. In basic, ultrapure water can be produced by conducting the following steps successively: (1) a preliminary step in which substances causing turbidity and colloidal substances contained in material water are removed; (2) a step in which fine particles, living organisms, salts and organic substances are removed with a reverse osmotic membrane; (3) a step in which dissolved gas molecules such as oxygen and carbon dioxide are removed by a degassing apparatus; (4) a step in which ions present in minute amounts are removed by an electric deionizing apparatus; and (5) the final step in which fragments from ion exchange resins, living organisms and other fine particles which are still present are completely removed by the ultrafine filtering membrane.

It is known that the deionizing treatment can be conducted in two steps by arranging two electric deionizing apparatuses described above in series and passing water through these apparatuses successively (Japanese Patent Application Publication No. Heisei 4(1992)-72567). It is also known that silica components are effectively removed by adjusting pH at 9.5 or greater in the electric dialysis (U.S. Pat. No. 4,298,442).

However, the process comprising arranging two electric deionizing apparatuses in series and conducting the deionizing treatment in two steps has the following problem with respect to the removal of silica components contained in material water.

When silica components are removed in the first electric deionizing apparatus, the amounts of ions other than the silica components such as sodium ion remaining in the deionized water decrease since these ions are more easily removed than the silica components. When the obtained deionized water is supplied to the second electric deionizing apparatus without any treatment and deionized, passage of the electric current through the water subjected to the deionization becomes difficult and the fraction of the removed silica components does not much increase in the second electric deionizing apparatus. In particular, when deionized water obtained in the first electric deionizing apparatus is used as water supplementing concentrated water in the second electric deionizing apparatus without any additional treatment, passage of the electric current in the second electric deionizing apparatus is extremely difficult and the fraction of the removed silica components is small.

SUMMARY OF THE INVENTION

The present invention has an object of providing an electric deionizing apparatus which has two electric deionizing apparatus arranged in series and effectively removes silica and boron components, in particular, silica components, contained in material water to provide deionized water having a high resistivity and a process for deionizing water having the above characteristics.

As the result of extensive studies by the present inventors to achieve the above object, it was found that an apparatus having two electric deionizing apparatuses arranged in series and a means for adding an aqueous solution of an electrolyte into a flow route of water which supplies water released from the first electric deionizing apparatus into the second electric deionizing apparatus is suitable for the purpose and that silica and boron components, in particular, silica components, are effectively removed and deionized water having a high resistivity can be obtained when material water is supplied to the first electric deionizing apparatus and deionized, an electrolyte is added to the deionized water and the obtained water is supplied to the second electric deionizing apparatus and deionized using the above electric deionizing apparatus. The present invention has been completed based on this knowledge.

The present invention provides:

(1) An electric deionizing apparatus which comprises a first electric deionizing apparatus and a second electric deionizing apparatus arranged in series, in which material water is deionized by the first electric deionizing apparatus and subsequently deionized by the second electric deionizing apparatus, and a means for adding an aqueous solution of an electrolyte into a flow route of water which supplies water released from the first electric deionizing apparatus into the second electric deionizing apparatus;

(2) An apparatus described in (1), wherein, as a flow route of water supplementing concentrated water in the second electric deionizing apparatus, a flow route branched from a flow route of water supplied to a desalting compartment of the second electric deionizing apparatus is connected to a flow route of the concentrated water;

(3) An apparatus described in any of (1) and (2), wherein a desalting compartment and a concentrating compartment of the second electric deionizing apparatus are each packed with an ion exchange resin;

(4) A process for electric deionization which comprises, using the electric deionizing apparatus described in any of (1), (2) and (3), supplying material water to a first electric deionizing apparatus, deionizing the material water by the first electric deionizing apparatus, adding an aqueous solution of an electrolyte to deionized water, supplying the deionized water to a second electric deionizing apparatus and deionizing the supplied deionized water by the second electric deionizing apparatus;

(5) A process described in (4), wherein the deionized water supplied to the second electric deionizing apparatus has an electric conductivity of 10 $\mu$S/cm or greater;

(6) A process described in any of (4) and (5), wherein the aqueous solution of an electrolyte is an aqueous solution containing an alkali;

(7) A process described in (6), wherein the deionized water supplied to the second electric deionizing apparatus has a pH of 9.2 or greater;

(8) A process described in any of (4), (5), (6) and (7), wherein a concentration of silica in a concentrated water in the second electric deionizing apparatus is kept at 100 ppb or smaller;

(9) A process described in any of (4), (5), (6), (7) and (8), wherein desalting compartments in the first electric deionizing apparatus and in the second electric deionizing apparatus are operated under at least one of conditions of an applied voltage of 2 to 10 V/cell and an electric current efficiency of 10% or smaller; and

(10) A process described in any of (4), (5), (6), (7), (8) and (9), wherein the material water contains silica or boron.

Figure 1:
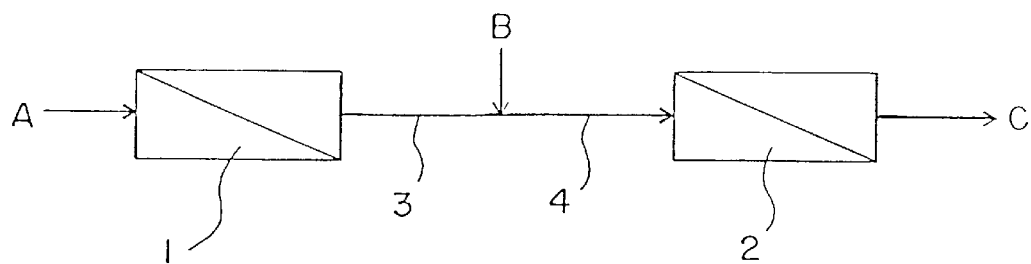
FIG. 1 shows a schematic diagram describing the process for electric deionization of the present invention.

In the Figures, the numbers and the characters have the following meanings:

1: A first electric deionizing apparatus
1a: A desalting compartment of the first electric deionizing apparatus
1b: A concentrating compartment of the first electric deionizing apparatus
2: A second electric deionizing apparatus
2a: A desalting compartment of the second electric deionizing apparatus
2b: A concentrating compartment of the second electric deionizing apparatus
3: Water deionized by the first electric deionizing apparatus
4: Water supplied to the second electric deionizing apparatus
5: A circulation pump
6: A circulation pump
7: A circulation pump
A: Material water
B: An aqueous solution of an electrolyte
B': An aqueous solution of NaOH
C: Water deionized by the second electric deionizing apparatus
D: Concentrated water in the first electric deionizing apparatus
E: Concentrated water in the second electric deionizing apparatus
F: Concentrated water

DETAILED DESCRIPTION OF THE INVENTION

The electric deionizing apparatus of the present invention has two electric deionizing apparatuses arranged in series. Material water is deionized by the first electric deionizing apparatus and water deionized by the first electric deionizing apparatus is supplied to the second electric deionizing apparatus and further deionized.

The type of the first electric deionizing apparatus and the second electric deionizing apparatus used in the present invention is not particularly limited and a conventional electric deionizing apparatus can be used. In general, an electric deionizing apparatus has the following structure: a plurality of desalting compartments and concentrating compartments are disposed alternately; each desalting compartment has an anion exchange membrane and a cation exchange membrane as a pair disposed in a manner such that the anion exchange membrane and the cation exchange membrane of each pair are faced to each other; each desalting compartment contains an ion exchanger packed into the space between the pair of membranes; the concentrating compartments and the desalting compartments are alternately disposed adjacent to each other via the anion exchange membranes and the cation exchange membranes which are disposed alternately; and an anode compartment in which an anode is disposed and a cathode compartment in which a cathode is disposed are disposed at the ends of the row of the desalting compartments and the concentrating compartments. In the electric deionizing apparatus having the above structure, when an electric potential is formed in the apparatus by applying a prescribed voltage at the anode and the cathode at the ends of the apparatus and water is passed through the apparatus, cations pass through the cation exchange membrane and are transported to the concentrating compartment, anions pass through the anion exchange membrane and are transported to the concentrating compartment and desalted water is obtained at an outlet of the desalting compartment. The cations and the anions transported to the concentrating compartments are removed to the outside of the system as concentrated water.

In the present invention, it is necessary that the desalting compartments and the concentrating compartments in the second electric deionizing apparatus have a low electric resistance so that the electric current easily flows through the electrodes of the second electric deionizing apparatus and the fraction of the removed silica components in the second electric deionizing apparatus increases. Therefore, it is necessary that a means for adding an aqueous solution of an electrolyte into water which has been deionized in the first electric deionizing apparatus and is supplied to the second electric deionizing apparatus be disposed.

It is preferable that the voltage applied to the electric deionizing apparatus is in the range of 2 to 10 V per one cell of the desalting compartment. When the voltage is lower than this range, the fraction of the removed silica and the like decreases. When the voltage exceeds this range, the lives of ion exchange resins and the like decrease. Therefore, such voltages are not preferable. When a voltage a (V) is applied between two electrodes of the electric deionizing apparatus having n desalting compartments, the applied voltage per one cell can be obtained as a/n (V).

From the standpoint of removal of silica, it is preferable that, in the first electric deionizing apparatus and the second electric deionizing apparatus, the electric current efficiency is 10% or smaller and the current density is 30 mA/dm$^2$ or greater. The electric current efficiency e (%) is obtained in accordance with the following equation [1]:

$$e=\{1.31 \times Q \times (Cf-Cp)\}/I \quad [1]$$

In equation [1], I represents the electric current (A), Q represents the amount of water deionized by the module (liter/min/cell), Cf represents the equivalent electric conductivity ($\mu$S/cm) of water supplied to the electric deionizing apparatus which is obtained in accordance with the following equation [2] and Cp represents the electric conductivity ($\mu$S/cm) of water deionized by the electric deionizing apparatus.

$$Cf=C1+C2+C3 \quad [2]$$

In equation [2], C1 represents the electric conductivity ($\mu$S/cm) of water supplied to the electric deionizing apparatus, C2 represents the carbon dioxide equivalent electric conductivity ($\mu$S/cm) of water supplied to the electric deionizing apparatus which is obtained in accordance with the following equation [3] and C3 represents the silica equivalent electric conductivity ($\mu$S/cm) of water supplied to the electric deionizing apparatus which is obtained in accordance with the following equation [4].

$$C2=2.66 \times C_{CO_2}= \quad [3]$$

$$C3=1.94 \times C_{SiO_2}= \quad [4]$$

In the above equations, $C_{CO_2}$ represents the concentration of carbon dioxide (mg $CO_2$/liter) and $C_{SiO_2}$ represents the concentration of silica (mg $SiO_2$/liter).

The means for adding an aqueous solution of an electrolyte is not particularly limited. For example, a tank for adjusting the electric conductivity or pH which is equipped with a stirrer may be disposed in the flow route of water. Alternatively, an inlet for injecting an aqueous solution of an electrolyte may be disposed in the flow route of water and a static mixer may be disposed in the flow route at a downstream position of the inlet.

In the electric deionizing apparatus of the present invention, as the ion exchanger packed into the desalting compartment of the first electric deionizing apparatus, an anion exchanger alone or a mixture of an anion exchanger and a cation exchanger can be used. Specifically, a mixture of an anion exchanger and a cation exchanger in a ratio of the amounts by volume in the range of 100:0 to 50:50 is preferable.

The thickness of the desalting compartment of the first electric deionizing apparatus is not particularly limited. It is preferable that the thickness is in the range of 2 to 60 mm. When the thickness is smaller than 2 mm, forming the desalting compartment is structurally difficult. When the thickness exceeds 60 mm, the fraction of the removed silica components decreases.

In the second electric deionizing apparatus of the electric deionizing apparatus of the present invention, it is preferable that the concentration of silica in the concentrated water in the concentrating compartment is small. It has been found that, when the concentration of silica in the concentrated water is great, the effect of reverse diffusion from the ion exchange membranes increases. This effect is particularly great when it is required that the concentration of silica in deionized water be very small. It is also considered that, when the concentration of silica in the concentrated water is small, polarization of the concentration in the ion exchange membranes at the side of the concentrated water decreases and transportation of the silica components in the desalting compartment into the concentrating compartment becomes easier due to the resulting equilibrium on the transportation of silica in the ion exchange membranes. In particular, in order to achieve a concentration of silica components of 0.1 ppb or smaller in water deionized in the second electric deionizing apparatus, it is preferable that the concentration of silica in water at the outlet of the concentrating compartment of the second electric deionizing apparatus is kept at 100 ppb or smaller. The concentration of silica in water at the outlet of the concentrating compartment of the second electric deionizing apparatus can be controlled by adjusting the amount of the concentrated water removed from the second electric deionizing apparatus to the outside of the system.

Therefore, in the apparatus of the present invention, it is advantageous that a flow route of water added to the concentrated water in the second electric deionizing apparatus as the supplement is formed by branching the flow route of water supplied to the desalting compartment of the second electric deionizing apparatus and connecting the branched flow route to the flow route of the concentrated water and a portion of water to be supplied to the desalting compartment of the second electric deionizing apparatus is used as water supplementing the concentrated water in the second electric deionizing apparatus. Water deionized in the second electric deionizing apparatus, water obtained by further deionizing this water or ultrapure water supplied from another system may also be used as water supplementing the concentrated water. Any method can be used as long as the concentration of silica in the concentrated water in the second electric deionizing apparatus can be reduced. It is the simplest method that a portion of water deionized in the first electric deionizing apparatus is used as water supplementing the concentrated water. In this case, since water supplied to the second electric deionizing apparatus and water added to the concentrated water as the supplement are both deionized water, the flow of electric current through the second electric deionizing apparatus is suppressed and removal of silica becomes difficult. Therefore, an electrolyte is added as will be shown in FIG. 2 later so that the passage of the electric current through the second electric deionizing apparatus is surely achieved and the fraction of the removed silica is remarkably increased due to this effect in combination with the effect of the decrease in the concentration of silica in the concentrated water.

Among various types of electric deionizing apparatuses having desalting compartments packed with an ion exchanger, some apparatuses have concentrating compartments which are not packed with an ion exchanger and some other apparatuses have concentrating compartments which are packed with an ion exchanger (for example, Japanese Patent Application Publication No. Heisei 7(1995)-16587). It has been found that the apparatuses having concentrating compartments packed with an ion exchanger give more advantageous results with respect to the fraction of the removed silica when the concentration of silica is small. The reason is considered as follows: the smaller the concentration, the greater the thickness of the boundary region in the polarization of the concentration in the concentrating compartment; transportation of silica components in the concentrating compartment is accelerated when the concentrating compartment is packed with an ion exchanger; and thus the polarization of the concentration decreases.

Therefore, in the electric deionizing apparatus of the present invention, it is preferable that the desalting compartments and the concentrating compartments in the second electric deionizing apparatus are each packed with an ion exchanger.

As the ion exchanger packed into the desalting compartment of the second electric deionizing apparatus, a mixture of an anion exchanger and an cation exchanger is generally used. The ratio of the amounts by volume of the anion exchanger and the cation exchanger is selected in the range of 4:6 to 8:2 and preferably in the range of 5:5 to 7:3.

As the ion exchanger packed into the concentrating compartment of the second electric deionizing apparatus, a mixture of an anion exchanger and an cation exchanger is generally used. The ratio of the amounts by volume of the anion exchanger and the cation exchanger is selected in the range of 4:6 to 8:2 and preferably in the range of 5:5 to 7:3. It is preferable that the thickness of the desalting compartment of the second electric deionizing apparatus is about 2 to 5 mm. When the thickness is smaller than 2 mm, forming the desalting compartment is structurally difficult. When the thickness exceeds 5 mm, resistivity of the deionized water becomes low.

The shape and the type of the anion exchanger and the cation exchanger used in the present invention are not particularly limited. The ion exchangers can be suitably selected from ion exchangers generally used as the ion exchangers in electric deionizing apparatuses, such as granules, pellets and fibers of anion exchange resins and cation exchange resins.

The process for electric deionization of the present invention will be described in the following.

In the process of the present invention, the deionization is conducted in two steps using the electric deionizing apparatus of the present invention which is described above. Material water (water to be deionized) is passed through the desalting compartment of the first electric deionizing apparatus and the deionization of the first step is conducted.

The history and the form of the material water supplied to the first electric deionizing apparatus are not particularly limited. For example, water pretreated with active carbon and a reverse osmotic membrane (an RO membrane) and by an apparatus for degassing with a membrane can be used.

In the process of the present invention, silica components are removed in the deionization of the first step using the first electric deionizing apparatus. An aqueous solution of an electrolyte is added to water deionized by the first electric deionizing apparatus and water containing the electrolyte is supplied to the second electric deionizing apparatus so that electric resistances in the desalting compartment and the concentrating compartment are decreased to facilitate passage of the electric current and silica components are further removed when the deionized water is supplied to the second electric ionizing apparatus and the deionization of the second step is conducted.

The aqueous solution of an electrolyte described above is not particularly limited. Examples of the aqueous solution include aqueous solutions containing at least one of NaCl, KCl, $Na_2SO_4$, $K_2SO_4$, NaOH and KOH. Since the silica components and the boron components which should be removed are easily dissociated and removed in an alkaline condition, aqueous solutions containing an alkali such as NaOH and KOH are preferable.

It is preferable that the amount of the aqueous solution of an electrolyte is selected so that water to be deionized after the addition of the electrolyte (water supplied to the second electric deionizing apparatus) has an electric conductivity of 10 $\mu$S/cm or greater and more preferably 25 $\mu$S/cm or greater. By adding the aqueous solution of an electrolyte in the preferable amount described above, the required amount of electric current can be passed through the second electric deionizing apparatus under a low voltage. When the amount of the aqueous solution of an electrolyte is added in an amount such that the electric conductivity exceeds 70 $\mu$S/cm, a great amount of the electrolyte is used and the condition is economically disadvantageous. Moreover, the second electric deionizing apparatus is subjected to a greater load and resistivity of water obtained from the second electric deionizing apparatus may decrease. Therefore, it is preferable that the aqueous solution of an electrolyte is added in an amount such that the electric resistance is 70 $\mu$S/cm or smaller.

It is more preferable that an aqueous solution containing an alkali is used as the aqueous solution of an electrolyte so that water has a pH of 9.2 or greater and more preferably 9.5 or greater after the addition of the electrolyte. By adding the aqueous solution of an electrolyte as described above, dissociation of silica components and boron components are accelerated in the second electric deionizing apparatus and greater fractions of the silica components and the boron components can be effectively removed.

Formation of scales in the second electric deionizing apparatus can be suppressed even when the second electric deionizing apparatus is operated at a great value of pH since anionic components such as carbonates and fluoride ions which tend to form scales have been removed.

In the first electric deionizing apparatus, as described for the electric deionizing apparatus of the present invention, it is preferable for removing silica components that an ion exchanger comprising an anion exchanger as the main component is used as the ion exchanger packed into the desalting compartment of the first electric deionizing apparatus. Specifically, it is preferable that a mixture of an anionic exchanger and a cationic exchanger in a ratio of the amounts by volume in the range of 100:0 to 50:50 is used.

Moreover, it is preferable that the desalting compartment of the first electric deionizing apparatus has a thickness in the range of 2 to 60 mm as described for the electric deionizing apparatus of the present invention.

In the process of the present invention, it is preferable that the concentration of silica in water supplementing the concentrated water in the second electric deionizing apparatus is small. The reason is that the reverse diffusion from the ion exchange membranes takes place when the concentrated water has a great concentration of silica. Therefore, it is not preferable that a portion of water to be supplied to the first electric deionizing apparatus is used as water supplementing the concentrated water in the second electric deionizing apparatus or the same concentrated water is used for the first electric deionizing apparatus and the second electric deionizing apparatus. It is preferable that a portion of water to be supplied to the second electric deionizing apparatus is used as water supplementing the concentrated water in the second electric deionizing apparatus.

FIG. 1 shows a schematic diagram of an example of the process for describing the process for electric deionization of the present invention. As shown in FIG. 1, in the process of the present invention, a first electric deionizing apparatus 1 and a second electric deionizing apparatus 2 are arranged in series. Material water (water to be deionized) A is supplied to the first electric deionizing apparatus 1 and the deionization of the first step is conducted. To the deionized water 3 which has been treated in the first step and comes out of the first electric deionizing apparatus 1, an aqueous solution of an electrolyte B is added. The obtained water 4 is supplied to the second electric deionizing apparatus 2 and the deionization of the second step is conducted. The deionized water C which has been treated in the second step is taken out of the system.

In accordance with the process of the present invention, the fraction of the removed silica components can be increased to 99.9% or greater and water having a high resistivity (about 18 MΩ·cm) can be obtained.

To summarize the advantages of the present invention, by arranging two electric deionizing apparatuses in series, supplying material water to the first electric deionizing apparatus to deionize the material water, adding an aqueous solution of an electrolyte to the deionized water and subsequently supplying the obtained water to the second electric deionizing apparatus to further deionize the water, silica components and boron components, in particular, silica components, are effectively removed and water having a high resistivity can be obtained. Even when the second electric deionizing apparatus is operated at a great value of pH, formation of scales can be suppressed since anionic components such as carbonates and fluoride ions which tend to form scales have been removed in the first electric deionizing apparatus.

EXAMPLES

The present invention will be described more specifically in the following with reference to examples. However, the present invention is not limited to the examples.

As material water (water to be deionized) in Examples and Comparative Examples, city water which had been pretreated with active carbon and a reverse osmotic membrane (an RO membrane) and by an apparatus for degassing with a membrane, had an electric resistance of 8 $\mu$S/cm and contained 1 ppm of $CO_2$ and 300 ppb of $SiO_2$ as the silica component was used.

Comparative Example 1

A first electric deionizing apparatus and a second electric deionizing apparatus were arranged in series. Material water was passed through the first electric deionizing apparatus and the deionization of the first step was conducted. The deionized water was supplied to the second electric deionizing apparatus, i.e., to a desalting compartment for deionization and to a concentrating compartment for supplementing concentrated water, and the deionization of the second step was conducted.

The first electric deionizing apparatus and the second electric deionizing apparatus each had three desalting compartments as the modules. The desalting compartments were packed with a mixture of a cation exchange resin (650C, manufactured by DOW CHEMICAL Company) and an anion exchange resin (550A, manufactured by DOW CHEMICAL Company) in a ratio of the amounts by volume of 4:6. As the membranes, a cation exchange membrane (CBM, manufactured by TOKUYAMA Co., Ltd.) and an anion exchange membrane (AHA, manufactured by TOKUYAMA Co., Ltd.) were used. A cell of the desalting compartment had a width of 187 mm, a height of 795 mm and a thickness of 2.5 mm.

The conditions of the operation were as follows: the amount of water passed through the first electric deionizing apparatus: 50 liter/hour; the amount of water passed through the second electric deionizing apparatus: 40 liter/hour; and the voltages applied to the first electric deionizing apparatus and the second electric deionizing apparatus: 15 V, each. After a continuous operation for 3 days, the quality of the deionized water was examined. The results are shown in Table 1 together with the conditions of the operation.

Example 1

The operation was conducted in accordance with the same procedures as those conducted in Comparative Example 1 except that an aqueous solution of sodium hydroxide was added to water deionized in the first electric deionizing apparatus in an amount of 2.9 mg/liter as Na so that the electric conductivity and pH of water supplied to the second electric deionizing apparatus were adjusted to 30 $\mu$S/cm and 9.9, respectively. Then, the quality of the deionized water was examined. The results are shown in Table 1 together with the conditions of operation.

Example 2

The operation was conducted in accordance with the same procedures as those conducted in Example 1 except that an anion exchange resin (550A, manufactured by DOW CHEMICAL Company) alone was used as the ion exchanger packed into the desalting compartment of the first electric deionizing apparatus and the amount of the aqueous solution of sodium hydroxide added to water was 2.6 mg/liter as Na. Then, the quality of the deionized water was examined. The results are shown in Table 1 together with the conditions of operation.

Example 3

The operation was conducted in accordance with the same procedures as those conducted in Example 2 except that a desalting compartment of a single cell having a thickness of 7.5 mm was used as the module of the first electric deionizing apparatus and the amount of the aqueous solution of sodium hydroxide added to water was 1.2 mg/liter as Na. Then, the quality of the deionized water was examined. The results are shown in Table 1 together with the conditions of operation.

TABLE 1

| | Comparable Example 1 | Example 1 | Example 2 | Example 3 |
|---|---|---|---|---|
| First electric deionizing apparatus | | | | |
| number of desalting compartment | 3 | 3 | 3 | 1 |
| thickness of desalting compartment (mm) | 2.5 | 2.5 | 2.5 | 7.5 |
| ion exchanger (ratio of amounts by volume) | 650C/550A (4/6) | 650C/550A (4/6) | 550A | 550A |
| Water deionized in the first step | | | | |
| concentration of $SiO_2$ (ppb) | 6 | 6 | 5 | 7 |
| electric conductivity ($\mu$S/cm) | 0.055 | 0.055 | 3 | 10 |
| Water supplied to the second step | | | | |
| concentration of Na (mg/liter) | — | 2.9 | 2.6 | 1.2 |
| electric conductivity ($\mu$S/cm) | — | 30 | 30 | 30 |
| pH | — | 9.9 | 9.9 | 9.9 |
| Water deionized in the second step | | | | |
| resistivity (M$\Omega$ · cm) | 18 | 18 | 18 | 18 |
| concentration of $SiO_2$ (ppb) | 5 | <0.1 | <0.1 | <0.1 |
| Concentrated water in the second step | | | | |
| concentration of $SiO_2$ (ppb) | 30 | 30 | 25 | 35 |
| First step | | | | |
| electric current (A) | 0.7 | 0.7 | 0.7 | 0.7 |
| electric current efficiency (%) | 4.1 | 4.1 | 4.1 | 4.1 |
| Second step | | | | |
| electric current (A) | 0.1 | 1.0 | 1.0 | 1.0 |
| electric current efficiency (%) | — | 8.7 | 8.7 | 8.7 |

Notes:
1) Material water: the electric conductivity: 8 $\mu$S/cm; $SiO_2$: 300 ppb; $CO_2$: 1 ppm
2) 650C: a cation exchange resin manufactured by DOW CHEMICAL Company
3) 550C: an anion exchange resin manufactured by DOW CHEMICAL Company
4) The second electric deionizing apparatus: the number of the desalting compartment: 3; the thickness of the desalting compartment: 2.5 mm; the ion exchanger: a mixture of 650C and 550A in a ratio of the amounts by volume of 4/6
5) Experiment temperature: 20 to 25° C.

As shown in Table 1, the fraction of the removed silica in Example 1 could be increased remarkably from that in Comparative Example 1. In Examples 1 to 3, the quality of the finally obtained deionized water was the same. However, the amount of the added sodium hydroxide was different among these Examples. In Example 1, the electric conductivity had to be adjusted from 0.055 $\mu$S/cm of the deionized water of the first step to 30 $\mu$S/cm of water supplied to the second electric deionizing apparatus. Similarly, the electric conductivity had to be adjusted from 3 $\mu$S/cm to 30 $\mu$S/cm in Example 2 and from 10 $\mu$S/cm to 30 $\mu$S/cm in Example 3. Thus, the amount of the alkali in Examples 2 could be reduced from that of Example 1 and the amount of the alkali in Example 3 could be reduced from those of Examples 1 and 2.

Example 4

Figure 2:
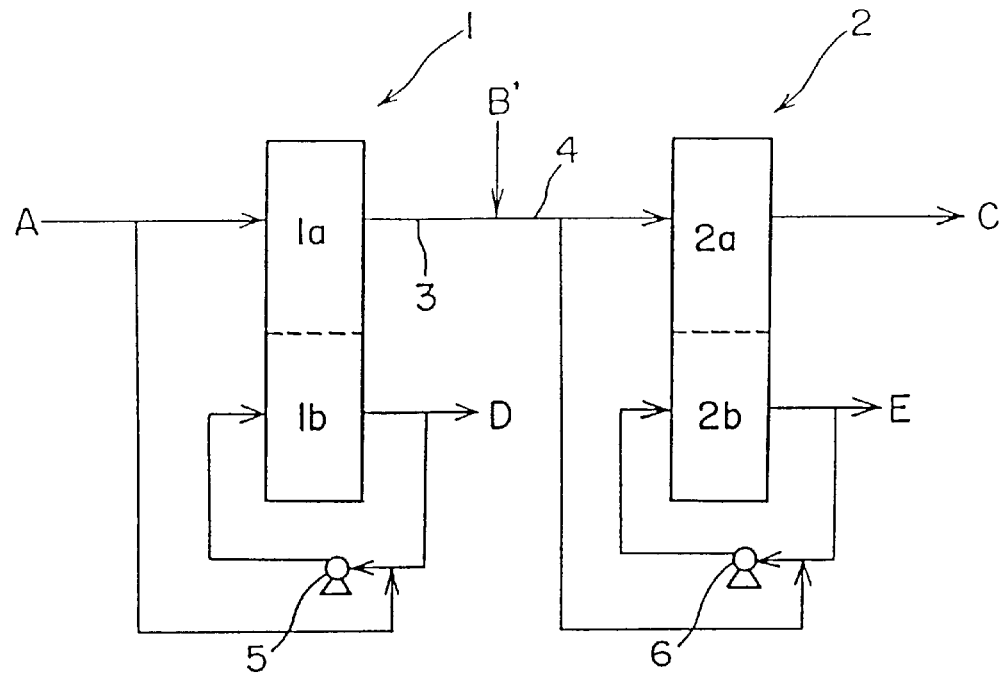
FIG. 2 shows a diagram describing the process used in Examples 4 and 5.

FIG. 2 shows a diagram describing the process of the present Example. In this process, a first electric deionizing apparatus 1 and a second electric deionizing apparatus 2 were arranged in series. Material water A was supplied to a desalting compartment 1a of the first electric deionizing apparatus and deionization is conducted. To the deionized water 3 of the first step coming out of the desalting compartment 1a of the first electric deionizing apparatus, an aqueous solution of NaOH B' is added. The obtained water 4 was supplied to a desalting compartment 2a of the second electric deionizing apparatus 2 and, after the deionization of the second step was conducted, was taken out as the deionized water of the second step C.

Concentrated water in a concentrating compartment 1b of the first electric deionizing apparatus 1 was circulated by a circulation pump 5. A portion of the circulating water was removed to the outside of the system as concentrated water of the first step D. To supplement the removed water, material water A was supplied to an inlet of the circulation pump 5. Concentrated water in a concentrating compartment 2b of the second electric deionizing apparatus 2 was circulated by a circulation pump 6. A portion of the circulating water was removed to the outside of the system as concentrated water of the second step E. To supplement the removed water, a portion of water 4 to be supplied to the desalting compartment 2a of the second electric deionizing apparatus was supplied to an inlet disposed at the suction side of the circulation pump 6.

City water pretreated with active carbon and an RO membrane and by an apparatus for degassing with membrane was used as material water. The material water was subjected to the deionizing treatment in accordance with the above process shown in FIG. 2.

The first electric deionizing apparatus and the second electric deionizing apparatus each had three desalting compartments as the modules. These desalting compartments were packed with a mixture of a cation exchange resin (650C, manufactured by DOW CHEMICAL Company) and an anion exchange resin (SSA10, manufactured by MITSUBISHI KAGAKU Co., Ltd.) in a ratio of the amounts by volume of 4:6. As the membranes, a cation exchange membrane (CBM, manufactured by TOKUYAMA Co., Ltd.) and an anion exchange membrane (AHA, manufactured by TOKUYAMA Co., Ltd.) were used. In the second electric deionizing apparatus, the concentrating compartments were also packed with the ion exchange resins described above. A cell of the desalting compartment had a width of 187 mm, a height of 795 mm and a thickness of 2.5 mm.

The conditions of the operation were as follows: the amount of water passed through the first electric deionizing apparatus: 88 liter/hour; the amount of water passed through the second electric deionizing apparatus: 80 liter/hour; the recoveries in the first electric deionizing apparatus and the second electric deionizing apparatus: 90%, each; the voltages applied to the first electric deionizing apparatus and the second electric deionizing apparatus: 21 V, each; the electric current in the first electric deionizing apparatus: 1.2 A; and the electric current in the second electric deionizing apparatus: 1.0 A. After a continuous operation for 14 days, the concentration of silica and boron in the deionized water was measured. The amount of the added aqueous solution of NaOH was adjusted so that the electric conductivity of water supplied to the desalting compartments of the second electric deionizing apparatus was 20 µS/cm. The results are shown in Table 2.

Example 5

The operation was conducted in accordance with the same procedures as those conducted in Example 4 except that the concentrating compartments of the second electric deionizing apparatus were packed with no ion exchange resin. The results are shown in Table 2.

Comparative Example 2

Figure 3:
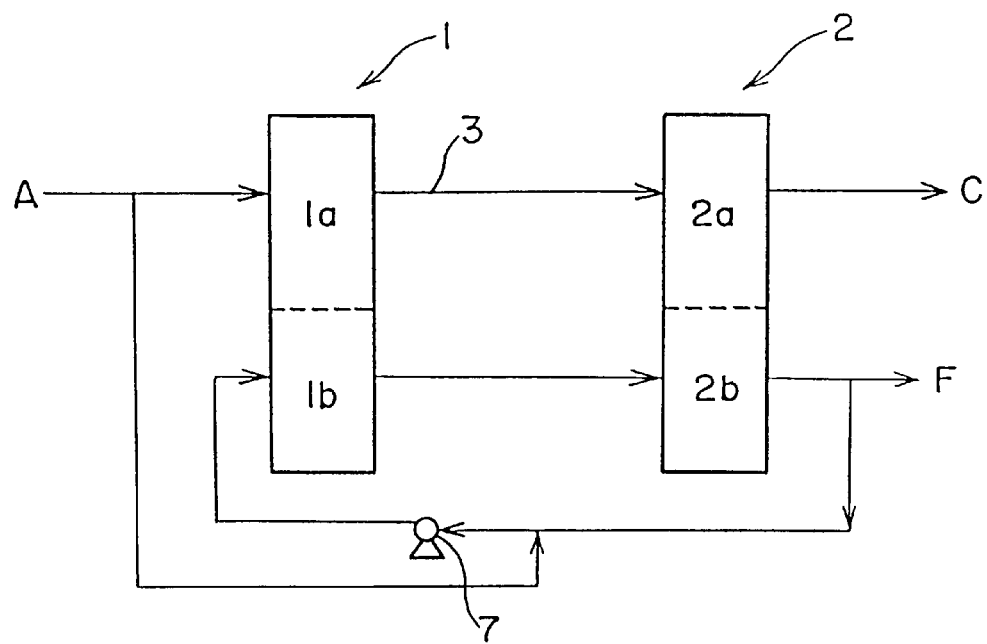
FIG. 3 shows a diagram describing the process used in Comparative Example 2.

FIG. 3 shows a diagram describing the process of the present Comparative Example. In this process, a first electric deionizing apparatus 1 and a second electric deionizing apparatus 2 were arranged in series. Material water A was supplied to a desalting compartment 1a of the first electric deionizing apparatus and the deionization is conducted. The deionized water 3 of the first step coming out of the desalting compartment 1a of the first electric deionizing apparatus was supplied to the desalting compartment 2a of the second electric deionizing apparatus 2 without additional treatments and, after the deionization of the second step was conducted, was taken out as the deionized water of the second step C.

Concentrated water in the concentrating compartment 1b of the first electric deionizing apparatus 1 and concentrated water in the concentrating compartment 2b of the second electric deionizing apparatus 2 were circulated by a circulation pump 7. A portion of the circulating water was removed to the outside of the system as concentrated water F. To supplement the removed water, material water A was supplied to an inlet disposed at the suction side of the circulation pump 7.

In the first electric deionizing apparatus and the second electric deionizing apparatus, the same modules as those used in Example 4 were used. However, the concentrating compartments of the second electric deionizing apparatus were packed with no ion exchange resin.

The material water was deionized in accordance with similar procedures as those conducted in Example 4 except that the operation was conducted in accordance with the process shown in FIG. 3. The amounts of water supplied to the desalting compartments of the first electric deionizing apparatus and to the desalting compartments of the second electric deionizing apparatus were each 80 liter/hour. The results are shown in Table 2.

TABLE 2

|  | Concentration of silica in material water (ppb) | Concentration of silica in deionized water (ppb) | Concentration of boron in material water (ppb) | Concentration of boron in deionized water (ppb) |
| --- | --- | --- | --- | --- |
| Example 4 | 400 | <0.1 | 10 | <0.1 |
| Example 5 | 400 | 0.2 | 10 | <0.1 |
| Comparative Example 2 | 400 | 2.8 | 10 | 0.8 |

What is claimed is:

1. An electric deionizing apparatus which comprises (a) a first electric deionizing apparatus, (b) a second electric deionizing apparatus arranged in series, in which material water is deionized by the first electric deionizing apparatus and is subsequently deionized by the second electric deionizing apparatus, the second electric deionizing apparatus comprising a desalting compartment and a concentrating compartment, (c) a means for adding an aqueous solution of an electrolyte into a flow of water which is released from the first electric deionizing apparatus and is supplied into the desalting compartment of the second electric deionizing apparatus, (d) a means for circulating concentrated water out of and into the concentrating compartment of the second electric deionizing apparatus and (e) a means for transporting a portion of said deionized water supplied to the desalting compartment of the second electric deionizing apparatus to the circulating concentrated water.

2. An apparatus according to claim 1, wherein each of the desalting compartment and the concentrating compartment of the second electric deionizing apparatus is packed with an ion exchange resin.

3. A process for electric deionization using the electric deionizing apparatus of claim 1, which comprises (a) supplying material water to a first electric deionizing apparatus, (b) deionizing the material water in the first electric deionizing apparatus, (c) adding an aqueous solution of an electrolyte to the deionized water released from the first electric deionizing apparatus and supplying said deionized water to a second electric deionizing apparatus and (d) deionizing the supplied deionized water in the second electric deionizing apparatus.

4. A process according to claim 3, wherein the deionized water supplied to the second electric deionizing apparatus has an electric conductivity of 10 µS/cm or greater.

5. A process according to claim 3, wherein the aqueous solution of an electrolyte is an aqueous solution containing an alkali.

6. A process according to claim 5, wherein the deionized water supplied to the second electric deionizing apparatus has a pH of 9.2 or greater.

7. A process according to claim 6, wherein a concentration of silica in a concentrated water in the second electric deionizing apparatus is kept at 100 ppb or smaller.

8. A process according to claim 3, wherein a concentration of silica in a concentrated water in the second electric deionizing apparatus is kept at 100 ppb or smaller.

9. A process according to claim 8, wherein each of the first electric deionizing apparatus and the second electric deionizing apparatus have a desalting compartment which are operated under at least one condition of an applied voltage of 2 to 10 V/cell and an electric current efficiency of 10% or smaller.

10. A process according to claim 9, wherein the material water contains silica or boron.

11. A process according to claim 8, wherein the material water contains silica or boron.

12. A process according to claim 3, wherein each of the first electric deionizing apparatus and the second electric deionizing apparatus have a desalting compartment which are operated under at least one condition of an applied voltage of 2 to 10 V/cell and an electric current efficiency of 10% or smaller.

13. A process according to claim 12, wherein the material water contains silica or boron.

14. A process according to claim 3, wherein the material water contains silica or boron.

15. A process for electric deionization using the electric deionizing apparatus of claim 2 which comprises (a) supplying material water to the first electric deionizing apparatus, (b) deionizing the material water in the first electric deionizing apparatus, (c) adding an aqueous solution of an electrolyte to the deionized water released from the first electric deionizing apparatus and supplying said deionized water to the second electric deionizing apparatus and (d) deionizing the supplied deionized water in the second electric deionizing apparatus.

16. A process according to claim 15, wherein the deionized water supplied to the second electric deionizing apparatus has an electric conductivity of 10 $\mu$S/cm or greater.

17. A process according to claim 15, wherein the aqueous solution of an electrolyte is an aqueous solution containing an alkali.

18. A process according to claim 17, wherein the deionized water supplied to the second electric deionizing apparatus has a pH of 9.2 or greater.

19. A process according to claim 18, wherein a concentration of silica in a concentrated water in the second electric deionizing apparatus is kept at 100 ppb or smaller.

20. A process according to claim 15, wherein a concentration of silica in a concentrated water in the second electric deionizing apparatus is kept at 100 ppb or smaller.

21. A process according to claim 20, wherein each of the first electric deionizing apparatus and the second electric deionizing apparatus have a desalting compartment which are operated under at least one condition of an applied voltage of 2 to 10 V/cell and an electric current efficiency of 10% or smaller.

22. A process according to claim 21, wherein the material water contains silica or boron.

23. A process according to claim 20, wherein the material water contains silica or boron.

24. A process according to claim 15, wherein each of the first electric deionizing apparatus and the second electric deionizing apparatus have a desalting compartment which are operated under at least one condition of an applied voltage of 2 to 10 V/cell and an electric current efficiency of 10% or smaller.

25. A process according to claim 24, wherein the material water contains silica or boron.

26. A process according to claim 15, wherein the material water contains silica or boron.

27. A process for electric deionization which comprises (a) supplying water to be deionized to a first electric deionizing apparatus, (b) adding an aqueous solution of an electrolyte to the deionized water from the first electric deionizing apparatus, (c) supplying said deionized water to a second electric deionizing apparatus, the second electric deionizing apparatus having a desalting compartment and a concentrating compartment, (d) circulating concentrated water out of and into the concentrating compartment of the second electric deionizing apparatus, (e) transporting a portion of said deionized water supplied to the desalting compartment of the second electric deionizing apparatus to the circulating concentrated water for the concentrating compartment of the second electric deionizing apparatus and (f) removing a portion of the circulating concentrated water from the concentrating compartment of the second electric deionizing apparatus.

28. The process according to claim 27, wherein the first electric deionizing apparatus has a desalting compartment and a concentrating compartment, the process further comprises circulating concentrated water out of and into the concentrating compartment of the first electric deionizing apparatus, diverting a portion of the water to be deionized in the first electric deionizing apparatus into the circulating concentrated water of the concentrating compartment of the first electric deionizing apparatus and removing a portion of the circulating concentrated water from the concentrating compartment of the first electric deionizing apparatus.

* * * * *